(12) United States Patent
Cummings et al.

(10) Patent No.: US 7,305,159 B1
(45) Date of Patent: Dec. 4, 2007

(54) DUAL-REFLECTOR LIGHT COUPLER

(75) Inventors: Christopher Cummings, Hampton, NH (US); Samuel P. Sadoulet, Barrington, NJ (US)

(73) Assignee: Edmund Optics, Inc., Barrington, NJ (US)

( * ) Notice: Subject to any disclaimer, the term of this patent is extended or adjusted under 35 U.S.C. 154(b) by 90 days.

(21) Appl. No.: 11/206,385

(22) Filed: Aug. 18, 2005

Related U.S. Application Data

(60) Provisional application No. 60/602,590, filed on Aug. 18, 2004, provisional application No. 60/646,917, filed on Jan. 25, 2005.

(51) Int. Cl.
*G02B 6/26* (2006.01)

(52) U.S. Cl. ............................. 385/31; 385/39

(58) Field of Classification Search ..................... None
See application file for complete search history.

(56) References Cited

U.S. PATENT DOCUMENTS

| | | |
|---|---|---|
| 3,995,935 A | 12/1976 | McCartney |
| 4,257,672 A | 3/1981 | Balliet |
| 4,385,800 A | 5/1983 | Basola et al. |
| 4,826,272 A | 5/1989 | Pimpinella et al. |
| 5,301,090 A | 4/1994 | Hed |
| 5,534,718 A | 7/1996 | Chang |
| 5,860,723 A | 1/1999 | Domas et al. |
| 6,022,123 A * | 2/2000 | Tomioka et al. ............ 362/244 |
| 6,290,382 B1 | 9/2001 | Bourn et al. |
| 6,526,201 B1 | 2/2003 | Mrakovich et al. |
| 2003/0091820 A1 | 5/2003 | Robbins |
| 2004/0120153 A1 | 6/2004 | Pate |

\* cited by examiner

*Primary Examiner*—Sung Pak
(74) *Attorney, Agent, or Firm*—Antonio R. Durando

(57) ABSTRACT

A reflector chamber, used to couple a light source to a downstream light-transport medium, includes a forward reflector which folds the light impinging upon it forward and a backward reflector that folds backwards the light received from the light source or the forward reflector. The two reflectors are judiciously shaped so as to maximize the energy density at the output aperture with an angle of emission within the numerical aperture of the downstream medium. The forward reflector is preferably shaped substantially flat and coplanar with the light source. The backward reflector is preferably a concave section. A diverging light reflector may be added to the output aperture of the coupler in order to increase its efficiency.

18 Claims, 2 Drawing Sheets

DUAL-REFLECTOR LIGHT COUPLER

RELATED APPLICATIONS

This application is based on U.S. Provisional Applications Ser. No. 60/602,590, filed Aug. 18, 2004, and Ser. No. 60/646,917, filed Jan. 25, 2005.

BACKGROUND OF THE INVENTION

1. Field of the Invention

This invention is related in general to the field of light engines and light transport couplers. In particular, it relates to coupler reflectors and to a configuration that consists of the combination of backward- and forward-reflecting surfaces designed to minimize the impact of manufacturing limitations on the radiance transferred to the target.

2. Description of the Related Art

While the invention is described herein for convenience in the context of a light-emitting-diode (LED) coupled to a conventional optical fiber, it is not intended to be so limited in its applications. As is well understood in the art, LEDs consist of an active region and a surrounding structure through which the light is radiated. Light emission from the active region is generally considered isotropic within the chip, but the spatial and angular distributions that a coupling optic must address are complicated by the surrounding structure. The various materials used in the LED structure, their refractive indices, the shape of the structure, and the surface texture are examples of factors that can affect the light distribution and the efficiency with which the light is emitted from the LED surfaces. In general, the result of all of these factors is a source that has a very broad angular emission that must be harnessed for most applications through the use of an optical coupler.

A common issue in the design of optical couplers resides in the fact that a decrease in the solid angle of emission from the coupler inherently requires some minimum increase in the output aperture size relative to the source (because of the principle of energy conservation and the related concept of "etendue"). In practice, it is difficult to design optical systems that can efficiently redirect light to the desired angular spread with the minimum increase in size—i.e., the output apertures must typically be enlarged beyond the theoretical minimum to avoid losing much of the optical power. This excess increase of the output size is seen as a decrease in radiance, or brightness, as compared to a coupler operating at the theoretical limit.

Regardless of the specific application, the development of coupler reflectors that minimize the loss of brightness as the light is propagated forward has been a very desirable objective in the art. To that end, many coupling devices have been developed to direct the light emitted by the source forward toward the aperture along the optical axis of the system. Typically, focusing optics and/or concave reflectors positioned around the source in some specific geometric configuration designed to optimize the usable energy output are used. See, for example, U.S. Pat. No. 3,995,935, No. 4,257,672, No. 4,385,800, No. 4,826,272, No. 5,860,723, and U.S. Publications No. 20030091820, No. 20040136081 and No. 20040120153. In all cases, the reflectors are designed to fold the light forward toward the aperture of the coupler device. In the case of LED sources, partially or fully ellipsoidal reflectors with the LED positioned in the vicinity of the rear focus of the ellipsoidal structure have been found to be particularly useful, especially in coupler devices for fiber-optic applications.

When such concave reflectors are used to couple an LED to an output aperture, the optimized theoretical reflector solution requires that the reflector curve extend all the way to the emitter base. However, mechanical clearance may be required for a variety of reasons, including chip tolerances, placement tolerances, and bond wire clearance. Based on these competing goals, the designer is confronted with the undesirable task of balancing the radiance transfer efficiency with mechanical clearance around the chip or chip array. Insufficient spacing around a chip or array could lead to a high rate of failure. Therefore, alternative reflector configurations have been explored with the general intent of achieving high brightness preservation without the mechanical issues of close-fit designs. As a result of this effort, it was discovered that a combination of forward and backward reflective surfaces can be used advantageously not only to facilitate the process of manufacture of LED couplers, but also to improve the as-manufactured performance of prior-art couplers.

BRIEF SUMMARY OF THE INVENTION

The invention involves a reflector chamber used to couple a light source to an output aperture, particularly an LED coupled to the end of a fiber-optic light pipe. According to one aspect of the invention, the reflector chamber includes two reflective surfaces. The first, called "forward reflector" for the purposes of this description, folds all the light impinging upon it forward along the optical axis of the coupler. The second, herein called "backward reflector," folds backwards along the optical axis all the light received either from the light source or from the forward reflector. The backward reflector includes an output aperture aligned with the optical axis of the coupler. The two reflectors are judiciously shaped so as to maximize the amount of energy folded toward the output aperture with a solid angle of emission within the numerical aperture of the fiber optic or other medium coupled to the LED.

According to another aspect of the invention, the forward reflector is shaped substantially flat and positioned normal to the optical axis of the coupler. The LED is placed substantially coplanar with the forward reflector, such that essentially none of the light emitted from the LED is radiated toward the forward reflector and essentially all the light impinging upon it is received from the backward reflector. The light emitted by the LED is either radiated directly out of the coupler through the output aperture or is first reflected one or more times by both the backward and the forward reflectors prior to being emitted through the output aperture. In the preferred embodiment, the backward reflector is substantially an ellipsoidal section with the light source positioned at the focus of the section.

In some embodiments of the invention, a diverging light reflector is also added to the output aperture of the reflecting chamber in order to further increase its efficiency by redirecting any light radiating with an angle of emission greater than the numerical aperture of the receiving fiber optic or medium. The additional reflector is again judiciously designed so as to further increase the total amount of light propagated forward within the desired numerical aperture. Considering the reflector chamber and diverging reflector as a two-stage coupler with no clearance requirements around the output of the first stage (reflector chamber), known high performance designs such as a Theta I/O reflector (a modified CPC reflector with input <90 Deg) can be used with good results for the second stage. In this way, the reflector chamber can be optimized to provide good mechanical clearance and high performance to the intermediate aperture with some initial degree of correction that does not necessarily meet the final target angular correction. The diverging light reflector is then used to achieve the final output to match a specific fiber NA or other target output.

Because of the lateral space allowed around the LED in the reflector chamber, the coupler of the invention is significantly easier to manufacture with the required tolerances for conventional LED construction. In addition, the forward/backward reflector combination has been found to be capable of providing performance that is suitably close to the theoretical efficiency of light propagation. Therefore, it is particularly suitable for use in light engines where a plurality of small light sources is coupled to an integrating device to provide a high-radiance compact source.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention is in the combination of a forward reflector with a backward reflector in a light coupler provided to propagate the light emitted by a source toward an output aperture optically connected to a light delivery device or a light transport device. The two reflectors are shaped so that the effect of their combination causes the light emitted from the minimally sized output aperture to be contained within a target solid angle of emission with an efficiency approaching the corresponding theoretical etendue limit.

As used herein, the term "forward reflector" refers to a reflective surface (or a combination of reflective surfaces) that reflects forward all the light impinging upon it received directly or indirectly from a source. In this context, "forward" means that the light radiates entirely toward the forward side of the coupler with respect to a plane normal to the main axis of the coupler. Similarly, the term "backward reflector" refers to a reflective surface (or a combination of reflective surfaces) that reflects backward all the light impinging upon it. "Backward" is any direction toward the back side of the light coupler with respect to a plane normal to the main axis of the coupler. The term "collector" is used to refer to a diverging light reflector coupled to the output aperture of the invention. The term "light" is intended to refer to electromagnetic radiation of any wavelength relevant to the use of the invention including, without limitation, X-ray, UV, visible, and IR radiation.

Figure 1:
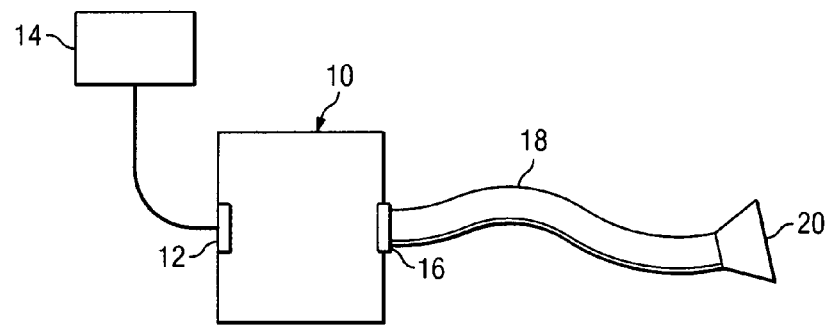
FIG. 1 is a schematic representation of a generic light coupler used to propagate the light emitted by a source forward to an output device through a fiber optic.

As is well understood in the art and illustrated in FIG. 1, a typical light coupler 10 is used to propagate a light source 12 energized by a power source 14 toward an output aperture 16. A light guide 18, such as an optical fiber or a bundle of fibers, is typically coupled to the aperture 16 to receive the light emitted through the aperture and propagate forward to an output device 20 the energy received within the angle of acceptance of the light guide. The challenge in the art is to propagate from the source 12 substantially all of the energy to the output aperture 16 within a desired solid angle and with minimal output aperture area, so that the brightness at the entrance of the light guide 18 is maximized (brightness is a function of both emitted angle and emission area). Additionally, depending on the application, a desirable objective is a degree of control over the far-field angular distribution of the energy radiated from the output aperture.

Figure 2:
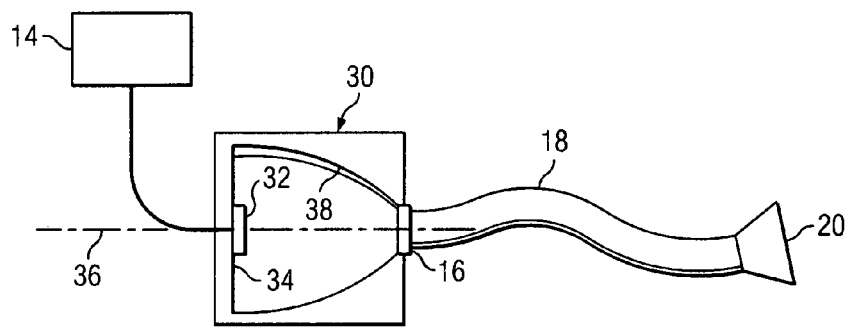
FIG. 2 is a schematic diagram of a coupler according to the invention, wherein a reflector chamber is provided that includes a backward reflector and a forward reflector folding the light emitted by a source toward an output aperture.

FIG. 2 illustrates a coupler 30 according to the invention wherein an LED light source 32 energized by a conventional power source 14 is coupled to an optical fiber 18 through the output aperture 16. The coupler 30 consists of a substantially flat forward reflector 34 disposed on a plane normal to the optical axis 36 of the coupler 30 (i.e., the axis passing through the light source and the aperture of the coupler). The LED 32 is preferably positioned in abutting relationship to the forward reflector 34, substantially coplanar with it. Thus, because of the planar geometry of the reflector 34, a relatively open space is retained on the sides of the LED 32 and the process of assembling it to the coupler is greatly facilitated with respect to prior-art concave configurations where the reflector surface is in close proximity of the LED.

The coupler 30 also includes a backward reflector 38, preferably contiguous to the peripheral edge of the forward reflector 34, adapted to reflect all light impinging upon it backwards toward the forward reflector 34. In a preferred embodiment of the invention, the backward reflector 38 consists essentially of an ellipsoidal-apex section positioned such that its corresponding front focus is substantially coextensive with the position of the LED 32. The output aperture 16 of the coupler is located toward the apex of the backward reflector 38, where it is optically coupled in conventional manner to the fiber 18.

As a result of this configuration, substantially all the light emitted by the LED 32 is initially radiated either toward the aperture 16 or the backward reflector 38. By sizing the aperture 16 appropriately, it is possible to control the amount of energy radiated directly with a solid angle of emission within the angle of acceptance of the fiber optic 18. Substantially all the light that is not emitted directly through the output aperture is reflected first by the backward reflector 38 and then by the forward reflector 34, and so on, until it is finally folded toward the aperture 16 with some angle of emission.

When an optical system has a target maximum output angle that is less than the widest angular emission of the light source, as is normally the case with light couplers, it is well known in the art that the effective output area must be increased in relation to the source area. Conservation of energy requirements establish a limiting relationship between the source size, the initial angle of emission, the target numerical aperture at the output, and the size of the output aperture. Numerical simulations of the performance of the light coupler of FIG. 2 conducted with conventional computer programs (such as available from commercial sources) have shown that the combination of forward and backward reflectors according to the invention produces a higher efficiency of propagation than previously obtained with prior-art light couplers when reasonable mechanical clearance limitations are considered. The profile of the reflectors is selected such that the maximum angle of light transmitted directly from the chip through the aperture is substantially equal to the maximum angle of light through the aperture that has interacted with the reflectors. Furthermore, theory suggests that these maximum-angle rays should be transmitted at the edges of the aperture that is sized relative to the source area and maximum angle. By judiciously shaping both the forward and the backward reflectors according to the particular features of the light source 32, the size of the aperture 16, and the nature and properties of the reflector material and of the output medium coupled to the aperture (such as the fiber 18), it is possible to approximate the maximum limit of efficiency for a given system. Therefore, the invention not only provides manufacturing advantages because of its geometry, which provides more clearance around the chip, but also produces suitable optical performance of the coupler.

For example, an embodiment consistent with the configuration of FIG. 2 was optimized using a commercial program. The coupler's backward reflector 38 consisted of an ellipsoidal section with a round axial output aperture 16. The light source 32 was an LED. The specific final design of the reflector chamber was obtained by modeling the propagation characteristics of the coupler assuming that it was coupled to an output with a given numerical aperture limit. The reflectors were assumed to be made of a known material and all optical parameters corresponding to that material were included in the model. The precise geometry of the coupler was iteratively upgraded in function of the propagation efficiency for each configuration to obtain the best possible performance with the reflector chamber of the invention. A propagation efficiency was attained that compared very favorably with the efficiency achieved by a good conventional light coupler with sufficient clearance to be readily manufacturable.

Figure 3:
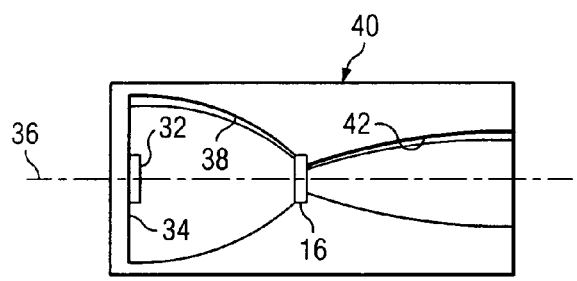
FIG. 3 is a schematic representation of another, preferred coupler according to the invention which includes a reflector coupled to the output aperture.
Figure 4:
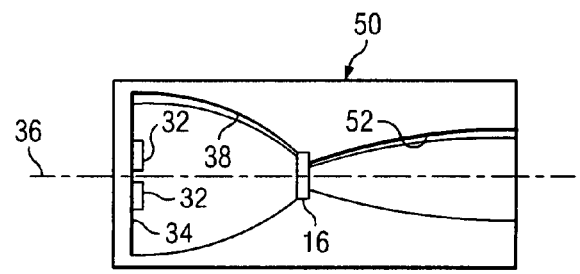
FIG. 4 is a schematic representation of a variation of the coupler of FIG. 3.
Figure 5:
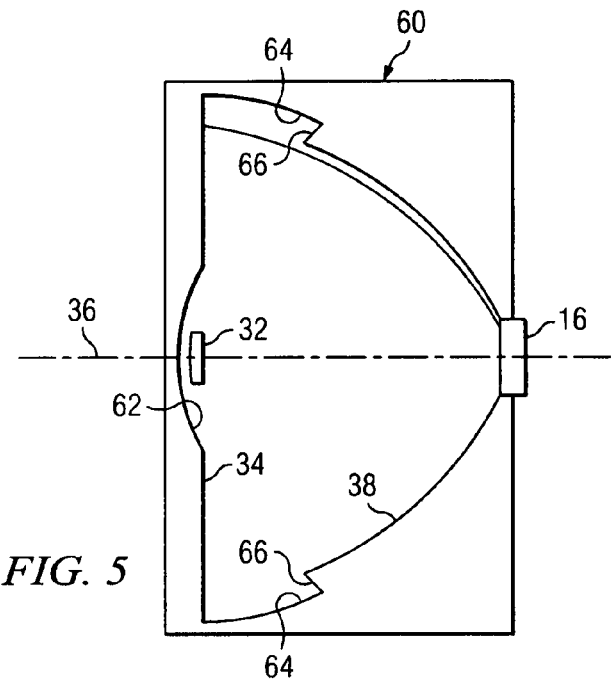
FIG. 5 is a schematic representation of the preferred embodiment of a coupler according to the invention.

FIGS. 3-5 illustrate additional embodiments of the invention incorporating the combination of a forward reflector and a backward reflector in a reflective chamber through which the light is propagated toward the output aperture of the coupler. In the coupler 40 of FIG. 3, a collector 42 is added to the reflective chamber in order to redirect within the numerical aperture of the downstream optics at least a portion of the light radiated at a greater angle from the aperture 16. As with prior-art couplers, the collector 42 may have a straight tapered shape (frustum), or a truncated spherical or parabolic shape, or a combination of these shapes, as found to be optimal for a particular coupler's light source, aperture, and reflector chamber. The collector 42 may also consist of various tilted or off-axis reflective sections. FIG. 4 illustrates a coupler 50 wherein the collector 52 consists of a combination of straight line and tilted parabolic sections (a Theta I/O modification of the standard CPC profile well known in the art). Two light sources 32 are included to illustrate the use of multiple types of sources (such as having different colors), which the invention enables as a result of the relatively flat configuration of the forward reflector 34.

The configuration of FIG. 4 was modeled using a commercial program and the exact shape of the collector 42 was achieved by theoretical design wherein the shape was freely optimized using traditional designs due to the fact that there are no mechanical clearance limitations around the intermediate reflector chamber output and final coupler output. Thus, it was found that the addition of a Theta I/O collector (as shown in FIG. 4) with a reflecting surface improved the performance of the reflector 30 of FIG. 2 in cases in which the target angular output was less than the ideal operating point of the reflective chamber alone.

FIG. 5 illustrates another embodiment of a coupler 60 according to the invention, wherein the reflector chamber is modified in an attempt to further improve its effectiveness for particular applications. While a combination of a forward reflector 34 with a backward reflector 38 is retained, each incorporates additional features deemed potentially advantageous for specific applications. A slightly concave central surface or well 62 is formed in the forward reflector 34 to provide output shaping capability to all or part of the forward reflector that has been previously described as a flat surface. The backward reflector 38 is modified by the addition of a peripheral surface 64 with a different curvature and therefore angular shaping characteristic than the ellipsoidal reflector 38 of FIGS. 2-4 and with a connecting annular surface 66. Various effects that could be advantageous in specific applications were observed. The final design for a specific application could be optimized through further modeling and iterative improvement.

Figure 6:
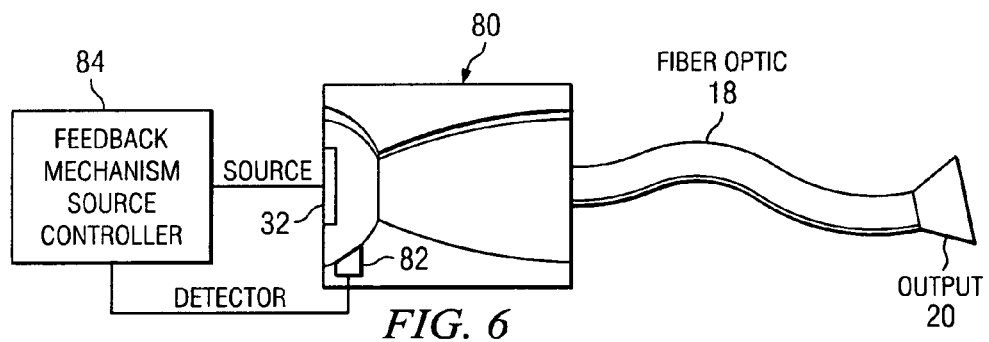
FIG. 6 illustrates a coupler containing a sensor to detect changes in the output of the light source and a control mechanism to adjust the output through feedback control.
Figure 7:
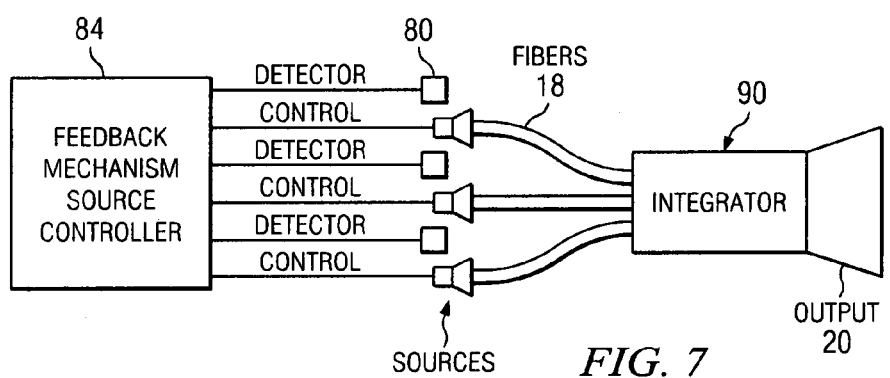
FIG. 7 illustrates the use of multiple couplers according to the invention in a light engine.

Thus, an improved general design has been provided for a light coupler which provides both manufacturing and as-manufactured performance advantages. Because of its acceptable propagation efficiency and suitability for achieving a desired angular distribution at the output aperture, the coupler of the invention is particularly suitable for light engines where multiple sources are integrated and coupled into a single output. As shown in FIG. 6, the reflector chamber of each coupler 80 may be equipped with a sensor 82 to measure a property of the light emitted by the source 32 (such as intensity, polarization, or color, for example). A feedback controller 84 is provided to change the operation of the source 32 according to some predetermined target performance (such as maintaining the color balance of a source array to a desired level. As in prior-art engines, it is expected that multiple light sources and corresponding couplers 80 according to the invention may be combined in an integrator 90 that provides a downstream output 20 suitable for a particular application, as illustrated in FIG. 7.

Those skilled in the art will recognize that the features of the invention may be implemented in various ways. For example, the forward reflector and the light source may be manufacture as an integral structure. The light source within each coupler may be single or multiple and consist of any conventional type (solid state, gas, arc, etc.). The reflectors may include various faceted portions designed to achieve particular objectives of performance or manufacture. The, collector when one is used, may include a refractive or diffractive element over the reflective surface. Similarly, the reflector chamber surfaces may also be lined with diffractive elements in order to achieve particular performance objectives.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A device for coupling a source of electromagnetic radiation to a downstream medium, comprising:
    a reflector chamber adapted to house the source of electromagnetic radiation, said chamber including a forward reflector, a backward reflector, and an output aperture in the backward reflector adapted for coupling to said medium;
    wherein said forward reflector is substantially flat and positioned normal to an optical axis of the device, the source is placed in abutting relationship to and substantially coplanar with the forward reflector such that substantially no electromagnetic radiation emitted from the source is radiated toward the forward reflector and substantially all electromagnetic radiation impinging upon the forward reflector is received from the backward reflector, and the forward and backward reflectors are combined to propagate the electromagnetic radiation toward said aperture.

2. The device of claim 1, further comprising a collector coupled to the output aperture for modifying an angular distribution of said electromagnetic radiation.

3. The device of claim 1, further comprising a sensor for measuring a property of said electromagnetic radiation and a control system for maintaining said property at a set value.

4. The device of claim 1, wherein said backward reflector is a portion of a substantially ellipsoidal surface and said source is substantially coextensive with a focus thereof.

5. The device of claim 1, wherein said source comprises multiple radiating components.

6. The device of claim 1, further comprising a collector coupled to the output aperture for modifying an angular distribution of said electromagnetic radiation; a sensor for measuring a property of the electromagnetic radiation; and a control system for maintaining said property at a set value; wherein said backward reflector is a portion of a substantially ellipsoidal surface; and said source is substantially coextensive with a focus of the ellipsoidal surface.

7. The device of claim 1, wherein said source is a source of visible light.

8. The device of claim 6, wherein said source is a source of visible light.

9. The device of claim 1, wherein said forward reflector includes a well for receiving said source of electromagnetic radiation.

10. The device of claim 1, wherein said backward reflector comprises multiple reflective surfaces.

11. The device of claim 1, wherein said medium is an optical fiber.

12. A light engine comprising:
    a plurality of light couplers, wherein each coupler includes a reflector chamber containing a light source, said chamber including a forward reflector, a backward reflector, and an output aperture in the backward reflector;
    an optical integrator coupled to said plurality of light couplers;
    an output in said integrator adapted for optical coupling to a downstream medium; and
    a power source adapted to energize said light source in the plurality of light couplers
    wherein said forward reflector in each coupler is substantially flat and positioned normal to an optical axis of the coupler, the source is placed in abutting relationship to and substantially coplanar with the forward reflector such that substantially no radiation emitted from the source is radiated toward the forward reflector and substantially all radiation impinging upon the forward reflector is received from the backward reflector, and the forward and backward reflectors are combined to propagate the radiation toward said output aperture in each coupler.

13. The light engine of claim 12, further comprising a light pipe coupling said output aperture in each of said plurality of light couplers to the optical integrator.

14. The light engine of claim 12, further comprising a sensor for measuring a property of radiation emitted by said light source in each of said plurality of light couplers and a control system for maintaining said property at a set value.

15. The light engine of claim 12, wherein said backward reflector in each of said plurality of light couplers is a portion of a substantially ellipsoidal surface and said source is substantially coextensive with a focus thereof.

16. The light engine of claim 12, wherein said light source in each of said plurality of light couplers comprises multiple radiating components.

17. The light engine of claim 12, wherein said forward reflector in each of said plurality of light couplers includes a well for receiving said light source.

18. The light engine of claim 12, wherein said backward reflector in each of said plurality of light couplers comprises multiple reflective surfaces.

* * * * *